United States Patent
Bagarolo et al.

(10) Patent No.: US 10,896,084 B2
(45) Date of Patent: Jan. 19, 2021

(54) ISOLATING SERVICE ISSUES IN A MICROSERVICE ARCHITECTURE

(71) Applicant: International Business Machines Corporation, Armonk, NY (US)

(72) Inventors: Antonio Bagarolo, Marcianise (IT); Marco Imperia, Rome (IT); Paolo Ottaviano, Rome (IT); Maximiliano Cammisa, Rome (IT); Pasquale Maria Mascolo Montenero, Barletta (IT)

(73) Assignee: International Business Machines Corporation, Armonk, NY (US)

( * ) Notice: Subject to any disclaimer, the term of this patent is extended or adjusted under 35 U.S.C. 154(b) by 244 days.

(21) Appl. No.: 15/969,068

(22) Filed: May 2, 2018

(65) Prior Publication Data

US 2019/0340059 A1   Nov. 7, 2019

(51) Int. Cl.
| | |
|---|---|
| G06F 11/00 | (2006.01) |
| G06F 11/07 | (2006.01) |
| G06F 8/60 | (2018.01) |
| H04L 12/24 | (2006.01) |
| H04L 29/08 | (2006.01) |

(52) U.S. Cl.
CPC ........ G06F 11/0793 (2013.01); G06F 11/079 (2013.01); G06F 11/0724 (2013.01);
(Continued)

(58) Field of Classification Search
CPC ..... G06F 8/65; G06F 8/70; G06F 8/71; H04L 41/20; H04L 41/24
See application file for complete search history.

(56) References Cited

U.S. PATENT DOCUMENTS 10,048,830 B2   8/2018  Jose et al.
10,498,601 B2 * 12/2019  Ahuja .................... H04L 41/08
(Continued)

OTHER PUBLICATIONS

Fredj, (Dynamic service substitution in service oriented architectures), IEEE, 2008 IEEE Congress on Services 2008—Part I, pp. 101-104 (Year: 2008).*

(Continued)

*Primary Examiner* — Bryce P Bonzo
*Assistant Examiner* — Jeison C Arcos
(74) *Attorney, Agent, or Firm* — Heslin Rothenberg Farley & Mesiti P.C.; Christopher Pignato, Esq.

(57) ABSTRACT

A method, computer program product, and a computer system for mitigating a fault in an information service comprised of multiple microservices includes a processor(s) obtaining a notification of a fault in the information service which includes logs tracking execution of the information service in a shared computing environment. The processor(s) generates a dependency data structure describing interdependencies between individual microservices with respect to each other. The processor(s) mitigates the fault by replacing a faulty microservice in the microservices represented in the dependency data structure; the faulty microservice includes program code with an issue resulting in the fault. To replace the faulty microservice, the processor(s) continuously monitors the information service and progressively replaces, in accordance with the interdependencies, each microservice represented in the dependency data structure with an earlier version of the microservice, halting replacements when no notification for the fault is obtained subsequent to a replacement of a given microservice.

20 Claims, 8 Drawing Sheets

(52) U.S. Cl.
CPC ...... *G06F 11/0751* (2013.01); *G06F 11/0772* (2013.01); *G06F 8/60* (2013.01); *H04L 41/50* (2013.01); *H04L 67/10* (2013.01)

(56) References Cited

U.S. PATENT DOCUMENTS

| | | | |
|---|---|---|---|
| 2006/0059253 A1* | 3/2006 | Goodman | G06Q 10/06 709/223 |
| 2016/0124742 A1 | 5/2016 | Rangasamy et al. | |
| 2016/0127454 A1* | 5/2016 | Maheshwari | G06F 9/5072 709/223 |
| 2016/0269482 A1 | 9/2016 | Jamjoom et al. | |
| 2017/0046146 A1* | 2/2017 | Jamjoom | G06F 8/71 |
| 2017/0063659 A1* | 3/2017 | Platon | H04L 41/065 |
| 2017/0111241 A1* | 4/2017 | Degioanni | H04L 41/5009 |
| 2017/0242784 A1* | 8/2017 | Heorhiadi | G06F 11/3692 |
| 2018/0109429 A1 | 4/2018 | Gupta et al. | |
| 2020/0133795 A1 | 4/2020 | Rhodes et al. | |

OTHER PUBLICATIONS

Mell et al., "The NIST Definition of Cloud Computing", National Institute of Standards and Technology, U.S. Dept. of Commerce, NIST Special Publ. 800-145, Sep. 2011, 7 pages.

Toffetti et al., "An Architecture for Self-Managing Microservices", https://dl.acm.org/citation.cfm?id=2747474, 2pages.

Rajagopalan et al., "App-Bisect: Autonomous Healing ofr Microservice-based Apps", https://www.usenix.org/system/files/conference/hotcloud15/hotcloud15-rajagopalan.pdf, 7 pages.

\* cited by examiner

| 110 | 120 | 130 | 140 | 150 | STATUS |
|---|---|---|---|---|---|
| 4 | 4 | 4 | 4 | 4 | X |
| 4 | 3 | 4 | 4 | 4 | X |
| 4 | 3 | 3 | 4 | 4 | X |
| 4 | 3 | 3 | 3 | 4 | X |
| 4 | 3 | 3 | 3 | 3 | X |
| 4 | 2 | 3 | 3 | 3 | X |
| 4 | 2 | 2 | 3 | 3 | X |
| 4 | 2 | 2 | 2 | 3 | V |
| 4 | 2 | 2 | 2 | 4 | V |
| 4 | 2 | 3 | 2 | 4 | V |
| 4 | 3 | 3 | 2 | 4 | V |
| 4 | 3 | 4 | 2 | 4 | V |
| 4 | 4 | 4 | 2 | 4 | V |
| 4 | 4 | 4 | 3 | 4 | X |

FIG. 3

ISOLATING SERVICE ISSUES IN A MICROSERVICE ARCHITECTURE

BACKGROUND

A microservice architecture is a method of developing software systems that enables support for a range of platforms and devices, including but not limited to, web-enables devices, mobile devices, Internet of Things (IoT) devices, and wearables. Because of this cross-platform and cross-device flexibility, this architecture is often utilized in shared computing systems and distributed systems, including in cloud computing systems. A microservice architecture provides a method for developing software applications, which are also referred to herein as information services, as suites of independently deployable, small, modular services, in which each service runs a unique process and communicates through a well-defined, lightweight, mechanism to serve a defined goal. Thus, a microservice architecture can be utilized to deploy multiple services that work together as a unique application. In this architecture, the overall versioning is represented by the sum of the single service code version. The multiplicity of the services provides a cohesive software solution across devices and platforms.

There is no industry consensus yet regarding the properties of microservices, and an official definition is missing as well. For purposes of this document, a "microservice" is defined as set of code that includes instructions and data for performing a computational function (called a "service") in a manner so that: (i) the microservice can be used with other microservices to make applications in the form of collections of loosely coupled services; (ii) the service provided by the microservice is fine-grained; and (iii) the protocols of the microservice are lightweight.

Some other possible characteristics of microservices may include one, or more, of the following (herein collectively referred to as the Twenty Possible Microservices Characteristics"): (i) services in a microservice architecture (MSA) are often processes that communicate over a network to fulfill a goal using technology-agnostic protocols (herein referred to as "network-communicative microservices"); (ii) microservices respectively provide services that are independently deployable (herein referred to as "independently deployable microservices"); (iii) the services are easy to replace (herein referred to as "easily replaceable microservices"); (iv) services are organized around capabilities (for example, user interface front-end, recommendation, logistics, billing, etc.) (herein referred to as "capability-centric microservices"); (v) services can be implemented using different programming languages, databases, hardware and software environment, depending on what fits best (herein referred to as generically-implementable microservices"); (vi) messaging enabled; (vii) bounded by contexts; (viii) autonomously developed, (ix) decentralized; (x) built and released with automated processes (herein referred to as "automated microservices"); (xi) naturally enforces a modular structure; (xii) lends itself to a continuous delivery software development process; (xiii) a change to a small part of the application only requires rebuilding and redeploying only one or a small number of services; (xiv) adheres to principles of business-driven development (for example, domain-driven design); (xv) uses IDEAL cloud application architectures; (xvi) uses polyglot programming and persistence; (xvii) uses lightweight container deployment; (xviii) exhibits decentralized continuous delivery; (xix) uses DevOps with holistic service monitoring; and/or (xx) provides characteristics that are beneficial to scalability.

It is known that there may be dependencies among and/or between microservices. Dependencies are any type of coupling among and/or between software modules. Dependencies include, but are not necessarily limited to, the following types (herein collectively referred to as "Eleven Possible Dependency Types"): (i) "low" (also "loose" and "weak"); (ii) "high" (also "tight" and "strong"); (iii) procedural programming type; (iv) content coupling; (v) common coupling; (vi) external coupling; (vii) control coupling; (viii) stamp coupling (also referred to as data-structured coupling); (ix) data coupling; (x) subclass coupling; and/or (xi) temporal coupling

SUMMARY

Shortcomings of the prior art are overcome and additional advantages are provided through the provision of a method for mitigating a fault in an information service comprised of multiple microservices. The method includes: obtaining, by one or more processors, a notification of a fault in an information service comprising multiple microservices, wherein the notification comprises logs tracking execution of the information service in a shared computing environment; generating, by the one or more processors, a dependency data structure describing interdependencies between individual microservices of the multiple microservices with respect to each other, wherein the generating comprises: analyzing, by the one or more processors, the logs to locate a transaction that generated the fault, where the transaction comprises an interaction between some of the multiple microservices; identifying, by the one or more processors, in the interaction, a source microservice and one or more destination microservices; and generating, by the one or more processors, the dependency data structure, wherein the dependency data structure comprises representations of the source microservice and the one or more destination microservices and the interdependencies, wherein the interdependencies comprise interdependencies between the source microservice and the one or more destination microservices; mitigating, by the one or more processors, the fault by replacing a faulty microservice in the microservices represented in the dependency data structure, wherein the faulty microservice comprises program code that includes an issue resulting in the fault, the mitigating comprising: continuously monitoring, by the one or more processors, the information service, to obtain notifications of the fault; and progressively replacing, by the one or more processors, in accordance with the interdependencies in the dependency data structure, each microservice represented in the dependency data structure with an earlier version of the microservice; and halting, by the one or more processors, the progressively replacing, when no notification for the fault is obtained, via the monitoring, subsequent to a replacement of a given microservice, wherein the given microservice is the faulty microservice.

Shortcomings of the prior art are overcome and additional advantages are provided through the provision of a computer program product for mitigating a fault in an information service comprised of multiple microservices. The computer program product comprises a storage medium readable by a processing circuit and storing instructions for execution by the processing circuit for performing a method. The method includes, for instance: obtaining, by one or more processors, a notification of a fault in an information service comprising multiple microservices, wherein the notification comprises logs tracking execution of the information service in a shared computing environment; generating, by the one or more processors, a dependency data structure describing interdependencies between individual microservices of the multiple microservices with respect to each other, wherein the generating comprises: analyzing, by the one or more processors, the logs to locate a transaction that generated the fault, where the transaction comprises an interaction between some of the multiple microservices; identifying, by the one or more processors, in the interaction, a source microservice and one or more destination microservices; and generating, by the one or more processors, the dependency data structure, wherein the dependency data structure comprises representations of the source microservice and the one or more destination microservices and the interdependencies, wherein the interdependencies comprise interdependencies between the source microservice and the one or more destination microservices; mitigating, by the one or more processors, the fault by replacing a faulty microservice in the microservices represented in the dependency data structure, wherein the faulty microservice comprises program code that includes an issue resulting in the fault, the mitigating comprising: continuously monitoring, by the one or more processors, the information service, to obtain notifications of the fault; and progressively replacing, by the one or more processors, in accordance with the interdependencies in the dependency data structure, each microservice represented in the dependency data structure with an earlier version of the microservice; and halting, by the one or more processors, the progressively replacing, when no notification for the fault is obtained, via the monitoring, subsequent to a replacement of a given microservice, wherein the given microservice is the faulty microservice.

Methods, computer program products and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 3 depicts a table that illustrates the functionality of certain aspects of some embodiments of the present invention;

DETAILED DESCRIPTION

Figure 1:
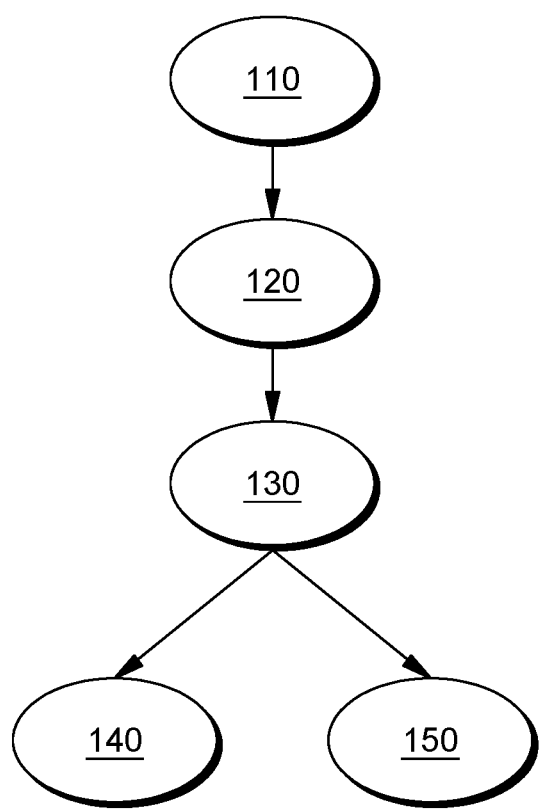
FIG. 1 is an illustration of a dependency data structure generated by program code in an embodiment of the present invention.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 6:
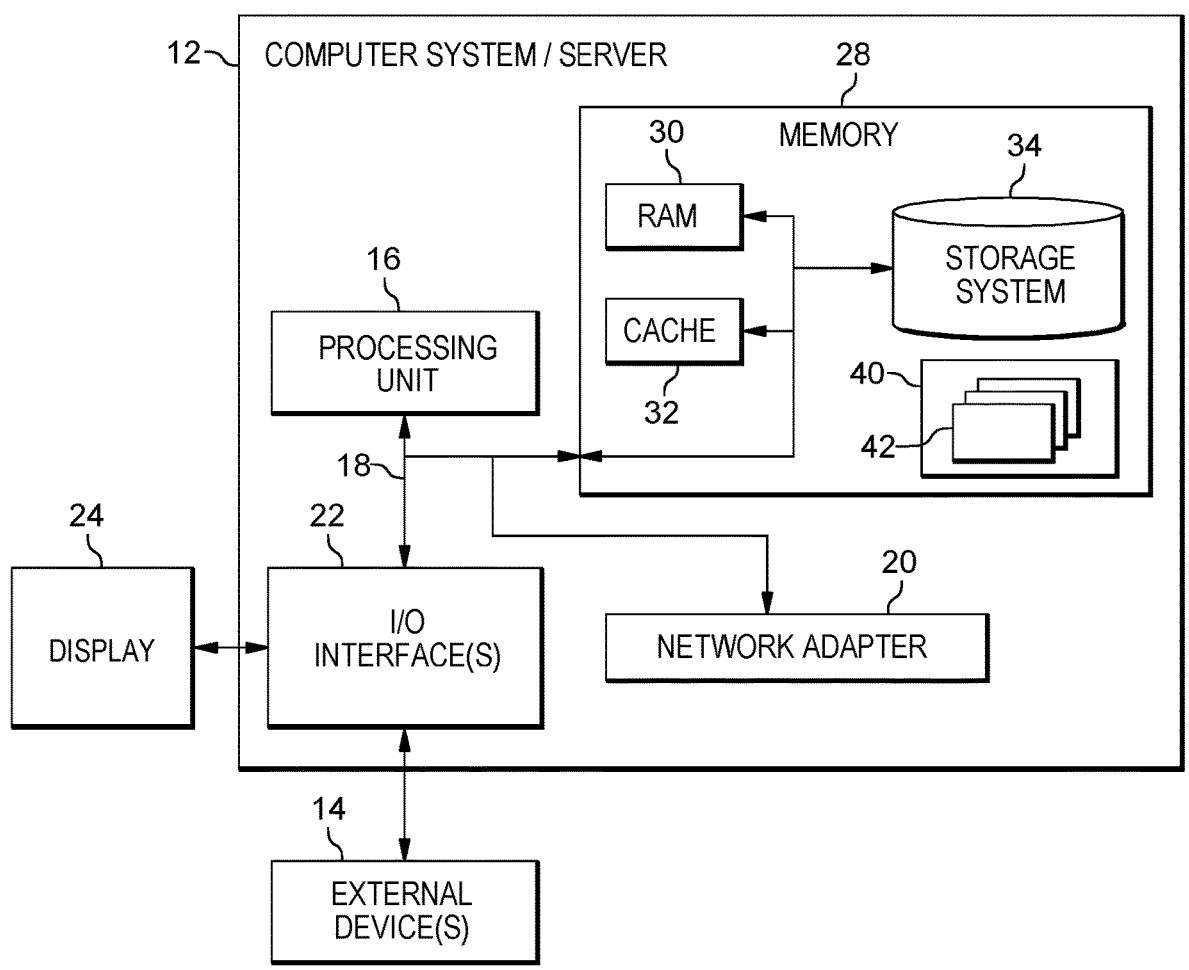
FIG. 6 depicts one embodiment of a computing node that can be utilized in a cloud computing environment.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 6 as program/utility 40, having a set (at least one) of program modules 42, which may be stored in memory 28.

A microservice architecture is utilized to deploy multiple services that work together as a unique application or information service. Thus, in this architecture, the overall versioning of a software application is represented by the sum of the single service code version. Although the multiplicity of the services and the ability of these services to provide a cohesive software solution (application, information service, etc.) across devices and platforms is advantageous for efficiency and consistency, the utilization of these multiple services as a single application can create challenges when an issue is inadvertently introduced into a deployment. With so many services combining to form the application, both discovering the source of the issue and mitigating that issue can present challenges.

One challenge in issue identification and mitigation in a microservice architecture is determining and managing the interdependencies of individual microservices comprising a given application. Microservices comprising an application may interact with each other, to pass data, instructions, etc., during execution. Issues in microservice-based software applications that lead to failures can be difficult to remediate because a software application, deployed as microservices, is comprised of multiple microservices, some depending on others. Because the whole software application is a sum of its parts, and the parts can be interdependent, locating the microservice that introduced the issue, and identifying the additional microservices affected by the issue, can prove challenging. Thus, to mitigate an issue in an application in a microservice architecture, in embodiments of the present invention, program code isolates a fault in an information service that includes multiple microservices.

Embodiments of the present invention include a computer-implemented method, a computer program product, and a computer system, that include a processor(s) executing program code to isolate a fault in an information service that includes multiple microservices. To isolate the fault, the program code calculates a dependency data structure. The dependency data structure describes interdependencies of individual microservices comprising the information service (or application) with respect to each other. The program code detects a microservice that is a source for the fault among the multiple microservices, based on analyzing log data generated by the information service. A microservice is a source of a fault when it initiates a call in a transaction that results in the fault. However, because the microservices are interdependent, and more than one microservice may interact in a given transaction, the issue that caused the fault may not be part of the code of the microservice that is the source, it may be a bug or issue in the code of a microservice that is called, directly or indirectly, by the source microservice. Thus, having identified the source microservice for the fault, the program code determines, from the dependency data structure, any additional microservice(s) that depend from the source microservice. The program code then replaces the source microservice using a different revision (i.e., version) of the same microservice.

In an aspect of some embodiments of the present invention, if the program code detects the fault, again, after replacing the version of the source microservice, the program code progressively replaces the additional microservice(s) until the program code no longer detects a faulty microservice.

In replacing the microservices, based on detecting a faulty microservice, the program code may utilize a phased approach. For example, in a first phase, the program code replaces each microservice (the source microservice and then, progressively, the additional microservice(s)) using a microservice version that corresponds to an earlier revision. In a second phase, the program code replaces each microservice using a microservice version that corresponds to a later revision of the microservice. This phased approach, which will be discussed illustrated in FIG. 3, enables the program code to identify the microservice version that introduced the issues, while deploying more recent versions of the microservices that are interdependent but do not include the issue. Using this phased approach, the program code may transition from the first phase (i.e., earlier version of the additional microservice(s)) to a second phase (i.e., later version of the additional microservice(s)) when the program code no longer detects the faulty microservice.

As aforementioned, the program code generates and utilizes the dependency data structure to determine which additional microservice(s) depend from a potentially faulty microservice. In an aspect of some embodiments of the present invention, the program code calculates this dependency data structure by determining, for a certain microservice, a set of microservices that call that certain microservice. The program may also utilize log data in order to calculate this dependency data structure. The resultant dependency data structure may include a directed graph.

Embodiments of the present invention provide advantages over existing methods of managing microsystems, at least because these existing methods do not provide a mechanism for automatically detecting a failure in a microservice architecture, identifying the program code that introduced the issue that caused the failure, and replacing only the microservice(s) affected by this issue. While embodiments of the present invention can isolate a fault and its source using an iterative strategy, existing microservice management approaches focus primarily on preventing performance degradation by monitoring distribution using logs and traces and implementing the microservice architecture in a manner that increases scalability and self-reliance. Although traditional software deployment enables a clean reversion to an older version, in a microservice architecture, when a newly deployed software version is found to be problematic, the multiplicity of the microservices that comprise a given version of the software application foreclose this traditional approach. In a microservice architecture, replacing a software application version is actually replacing multiple microservices and is therefore work intensive, costly, and detrimental to system efficiency. Thus, the targeted approach of detecting an issue in a microservice architecture and isolating and replacing only the microservice(s) affected by the issue, provides the advantage of processing efficiency within the computing environment. Specifically, aspects of embodiments of the present invention enable a continuous delivery architecture for the deployment of a microservice-based application.

Aspects of embodiments of the present invention are inextricably linked to computing and provide significantly more than existing approaches to the same technological challenges. The disclosed computer-implemented method, computer program product, and computer system are inextricably linked to computing at least because they are directed to improving the functionality of a specific application architecture in a shared computing environment. For example, embodiments of the present invention provide a novel approach to facilitating fault mitigation, in a microservice architecture executed in a shared computing environment, in a manner that enables continuous delivery of a microservice-based application, deployed to clients of the shared computing environment. The targeted approach of embodiments of the present invention provides a significant improvement to the microservice architecture at least because various aspects of the present invention decrease impacts of a bug in an individual microservice on the efficiency of a deployed application, by isolating and replacing the problematic version of the microservice. This targeted replacement enables continued use by various clients of newer versions of microservices not involved in producing the fault.

As will be discussed in reference to FIG. 1, in some embodiments of the present invention, program code executing on at least one processor isolates a fault in an information service (e.g., software application) that includes multiple microservices, by identifying a representational state transfer (REST) application program interface (API) that caused this issue. In microservice architectures, various microservices communicate with each other using REST APIs because REST APIs provide interoperability between desperate computer systems and resources. The program code in embodiments of the present invention can isolate an issue in a specific microservice and determine which other microservice(s) is affected by the issue in the specific microservice, by identifying the REST API that enables communication between the specific microservice (i.e., the source microservice) and the other microservice(s) (i.e., the destination microservice(s)). In some embodiments of the present invention, the microservices utilize different communication technologies to communicate across microservices, including HTTP and/or HTTPS. REST APIs are provided as a non-limiting example herein based on enabling cross-platform and cross-system communications.

FIG. 1 illustrates the interconnectivity of various microservices in a given software application as a dependency data structure 100, which is calculated by program code in embodiments of the present invention. The program code may generate the dependency data structure 100 by analyzing microservice execution logs and identifying a transaction identifier of a failed scenario. In some embodiments of the present invention, the program code identifies the REST API call that resulted in the fault (i.e., failed scenario) to identify a source microservice and the destination microservice(s) for this call. The program code determines the dependencies between the microservices that comprise the application based on the REST API interactions, producing a dependency data structure 100 to represent these dependencies. The dependency data structure 100 of FIG. 1 is provided for illustrative purposes only as a non-limiting example of a dependency data structure 100, generated by the program code, in embodiments of the present invention. For example, in some embodiments of the present invention, the program code generates a dependency data structure that includes a directed graph.

A microservice architecture enables support of an application across a range of platforms and devices and therefore may utilize REST APIs to provide connectivity of microservices comprising the application across the varied platforms and devices. REST or RESTful web services provide interoperability between computer systems on the Internet. REST-compliant web services enable a requestor to access and manipulate representations of web resources (e.g., applications) using a uniform and predefined set of stateless operations. A REST API uses generally HTTP requests to GET, PUT, POST and DELETE data and relies on a stateless, client-server, cacheable communications protocol. REST is an architecture style for designing networked applications and is therefore particularly prevalent in and relevant to, multi-server (multi-resource) computing environments. Specifically, because APIs provide interoperability between computer systems and allow for standardized connectivity, they are frequently utilized as endpoints on servers that enable other resources to access applications associated with the APIs that are deployed on the servers. For example, various REST APIs may be available from each of the individual servers in a multi-server environment, such as a cloud computing environment, providing endpoints to applications, including microservices, executing on the various servers.

Returning to FIG. 1, in the illustrated dependency data structure 100, the microservices communicate with each other utilizing REST APIs. FIG. 1 illustrates the interactions (e.g., interdependencies) between a first microservice 110, a second microservice 120, a third microservice 130, a fourth microservice 140, and a fifth microservice 150, that comprise a given software application in a microservice architecture. As seen in this non-limiting example, the arrows represent REST call interactions between the microservices 110 120 130 140 150. In FIG. 1, the first microservice 110 calls the second microservice 120, the second microservice 120 calls the third microservice 130, and the third microservice 130 calls both the fourth microservice 140 and the fifth microservice 150. This exemplary dependency data structure 100 and the underlying software application (see, e.g., FIG. 2, deployed application 225) are referenced throughout to illustrate certain aspects of embodiments of the present invention.

Figure 2:
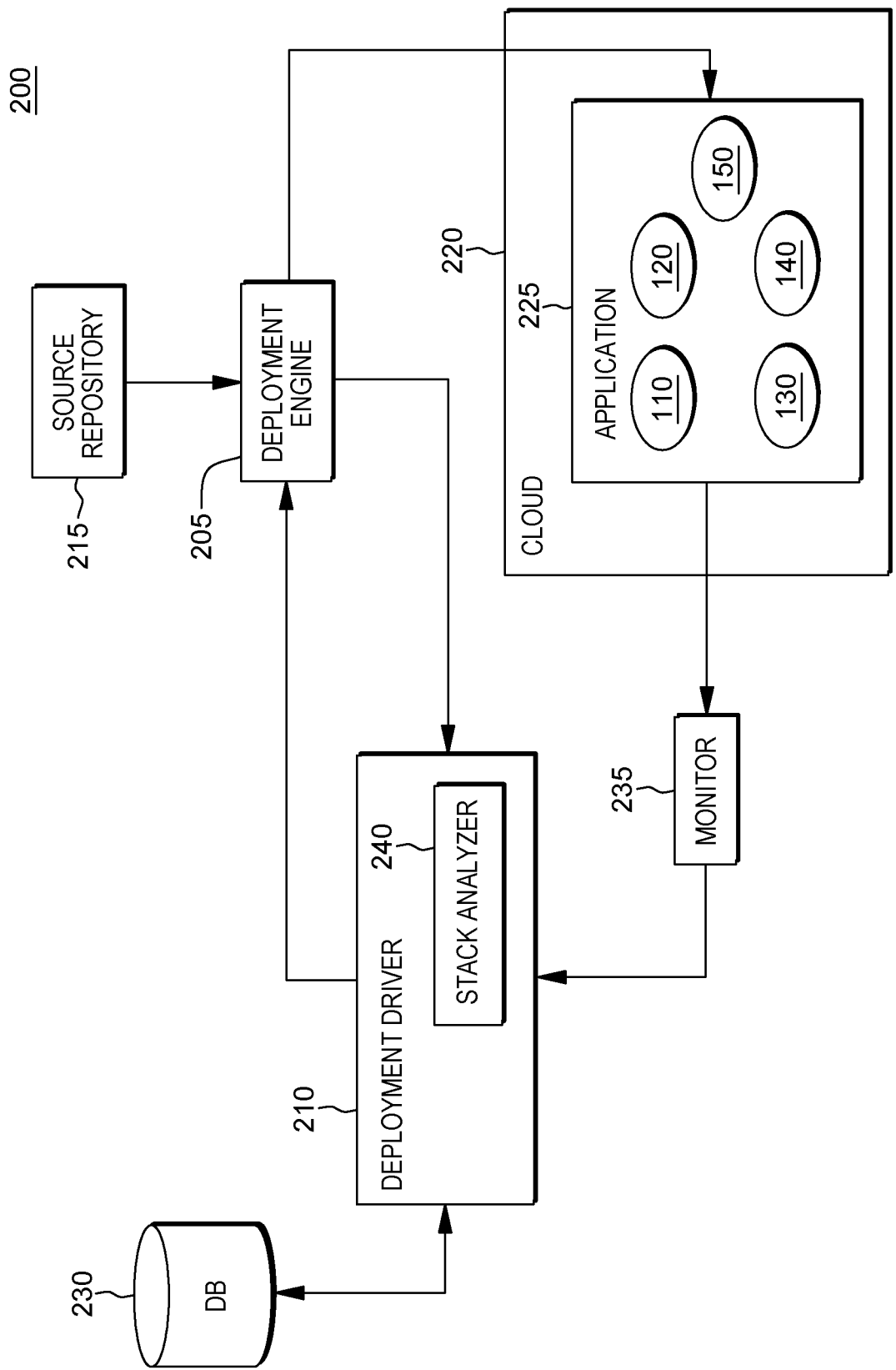
FIG. 2 depicts aspects of a technical environment into which aspects of an embodiment of the present technique can be integrated.

Turning to FIG. 1, in embodiments of the present invention, program code referred to as a deployment driver 210 isolates and mitigates a fault in an application that includes multiple microservices. FIG. 2 is an illustration of a continuous delivery architecture 200 for the deployment of the application. Aspects of the present invention, including program code that comprises the deployment driver 210, are illustrated in the continuous delivery architecture 200. FIG. 2 illustrates the interaction between various components of the continuous delivery architecture 200 in executing aspects of embodiments of the present invention.

In the continuous delivery architecture 200, a deployment engine 205 includes program code that readies each microservice of an application for deployment by downloading the source code, from a source repository 215, generating a build of the microservice from the source code, and validating the build (i.e., version). The deployment engine 205 deploys a particular version of each microservice in a shared computing environment. In FIG. 2, a cloud computing system 220 is the shared computing environment into which the deployment engine 205 deploys each microservice. Just as pictured in FIG. 1, in FIG. 2, a first microservice 110, a second microservice 120, a third microservice 130, a fourth microservice 140, and a fifth microservice 150, comprise the deployed application 225. When the deployment engine 205 deploys a microservice, it provides the deployment driver 210 with data identifying a version for each deployed microservice. The program code comprising the deployment engine 205 obtains the version data and stores this data in a database 230, as configuration data. Upon deployment, a microservice 110 120 130 140 150 and therefore, the deployed application 225, is accessible to clients utilizing services offered by the cloud computing system 220. The deployment engine 205 may store configuration data for each microservice version deployed in the database 230 before, after, and/or during deployment of the microservice version.

When a fault occurs in the deployed application 225, a monitor 235 alerts program code comprising a deployment driver 210 of the fault. As part of this alert, the monitor 235 may provide the deployment driver 210 with logs of all the microservices, including those logs with the fault alert. The monitor 235 may include various programs that trace the execution of each microservice 110 120 130 140 150.

In some embodiments of the present invention, the program code of the deployment driver 210 obtains the alert and the logs from the monitor 235 and parses the logs to identify: 1) the issue that generated the fault; and 2) the microservices that potentially include the issue that generated the fault. To identify the issue, the program code of the deployment driver 210 referred to herein as a stack analyzer 240, parses the logs to identify the error resulting in the fault. The stack analyzer 240 locates a failed trace to identify the microservices involved in the producing the fault, including the source microservice and the destination microservice(s) of a REST API call that preceded the fault. The stack analyzer 240 may utilize transaction identifiers in the log data to determine, based on REST API interactions between the microservices 110 120 130 140 150 that comprise the application 235, dependencies between the microservices 110 120 130 140 150. The program code of the deployment driver 210 generates a dependency data structure (e.g., FIG. 1, 100), which may be a generated as a graph, based on the identified dependencies.

Once the program code generates a dependency data structure (e.g., FIG. 1, 100), the program code of the deployment driver 210 utilizes an iterative process that follows the progressions in the dependency data structure (e.g., FIG. 1, 100) to mitigate the identified issue and prevent the reoccurrence of the fault. Using an iterative process, the program code utilizes the dependency data structure to iteratively identify and replace potentially problematic versions of microservices. To replace a microservice with a different version of that microservice, the program code of the deployment driver 210 retrieves configuration data relevant to the microservice from the database 230 and instructs the deployment engine 205 to deploy a specific version of this microservice. Based on this instruction, the deployment engine 205 deploys the specific version of the microservice to the cloud computing system 220, installing the replacement version of the microservice in place of the version previously deployed. The deployment driver 210 initially triggers the replacement of the source microservice and then, if the fault persists, the deployment driver 210 progressively enables the replacement of the destination microservice(s).

After replacing the source microservice, the program code of the deployment driver 210 continues to receive data from the monitor 235 regarding the performance of the application. After a version replacement, if the fault continues, as indicated by the monitor 235 and identified by the stack analyzer 240, the program code of the deployment driver 210 and the deployment engine 205 continue to replace potentially problematic versions of microservices until the fault is mitigated (i.e., the stack analyzer 240 does not identify this fault). Through this iterative process, the program code of the deployment driver 210 ultimately identifies and replaces the specific version of a specific microservice that is the root of the issue.

FIG. 3 is a table 300 that illustrates an iterative process utilized by the deployment driver (e.g., FIG. 2, 210) in embodiments of the present invention to isolate a version of the microservice (e.g., FIGS. 1-2, 110, 120, 130, 140, 150) responsible for a fault in an application (e.g., FIG. 2, deployed application 225). FIG. 3 utilizes an exemplary pattern for replacement of microservice versions to identify the specific version of the specific microservice that is the root of the issue (e.g., contains a bug). However, as understood by one of skill in the art, additional iterative progressions and patterns may be substituted for this example and utilized in embodiments of the present invention. The progression of the replacement of versions in FIG. 3 follows the dependency data structure 100 of FIG. 1.

The table of FIG. 3 includes a column representing each of the five microservices (i.e., first microservice 110, a second microservice 120, a third microservice 130, a fourth microservice 140, and a fifth microservice 150) that comprise an application 225 (FIG. 2). The columns note the versions of each microservice. The status column indicates whether the monitor 235 (FIG. 2) reports a fault that the stack analyzer 240 (FIG. 2) identifies as a given error. A status of "X" indicates the (continued) presence of the error and the status of "V" indicates that the error is no longer occurring, though execution of the microservices of the application, after replacement of a version of a microservice, has resumed. The first row of the chart 300 indicates the baseline version of each microservice was a version "4" when the monitor 235 (FIG. 2) reported a fault and the stack analyzer 240 (FIG. 2) identified this fault as originating from an error in an interaction (e.g., REST call) from the second microservice 120 (the source microservice) to the third microservice 130 (the destination microservice). Each row of the chart after the first row illustrates a version replacement iteration performed by the program code in an embodiments of the present invention, in order to ultimately isolate the error to a certain version of a specific microservice of the five microservices deployed as the application 225 (FIG. 1).

Referring to FIG. 1, according to the dependency data structure 100, the program code determined that the third microservice 130, the fourth microservice 140, and the fifth microservice 150 all depend, directly or indirectly, from the second microservice 120, based on the interaction between the second microservice 120 and the third microservice 130, that triggered the fault. Thus, each of these microservices are candidates for replacement to mitigate the fault.

As illustrated in FIG. 3, because the second microservice 120 is the source microservice for the fault, program code in an embodiments of the present invention (e.g., FIG. 2, deployment driver 210 and deployment engine 205) replaces the second microservice 120, which is at version 4, with version 3 of the microservice. However, as indicated in FIG. 3, in the status column, despite this replacement, the monitor 235 (FIG. 2) reports a fault and the program code (e.g., FIG. 2, stack analyzer 240) identifies this fault as the same application fault. Based on the dependency data structure 100, the program code (e.g., FIG. 2, deployment driver 210 and deployment engine 205) then replaces the destination microservice, the third microservice 130. The program code replaces version 4 of this microservice with version 3 of the third microservice 130. As indicated by the status column, despite this replacement, the fault persists.

The program code proceeds through the dependencies in the dependency data structure 100 (FIG. 1) until the fault no longer occurs. To reach this status, in this example, the program code eventually (iteratively) reduced the second microservice 120 to version 2, the third microservice to version 2, the fourth microservice 140 to version 2, and the fifth microservice to version 3. The first microservice 110 remains constant in the table 300 because the program code did not determine a potential connection of this microservice to the fault. Also, when deploying all the microservices potentially involved in producing the fault at a first lower version, version 3, still produced a fault, the program code began progressively deploying each microservice from the second microservice 120 to the fifth microservice 150, at a lower version, version 2. The fault stopped once the fourth microservice 140 was deployed at version 2, so the program code did not replace the fifth microservice 150 with a version 2.

In some embodiments of the present invention, although the program code has identified a combination of microservice versions that do not produce a given application fault, this combination may not include the most recent fault-free version of each microservice. The program code may also not have isolated the issue causing the fault to a specific version of a specific microservice. Thus, in some embodiments of the present invention, the program code begins progressively incrementing the versions of the microservices identified in the dependency data structure 100 (FIG. 1) until the fault is experienced again. Through this process, the program code identifies the specific version of the specific microservice that introduced the issue into the application that resulted in the fault. As illustrated in the table 300, version 3 of the fourth microservice 140 introduced the issue (e.g., bug) that caused the application fault. The program code determined that version 3 of the fourth microservice 140 contains the issue because replacing the versions did not result in the fault until the version of the fourth microservice 140 was changed, by the program code, from version 2 to version 3.

Figure 4:
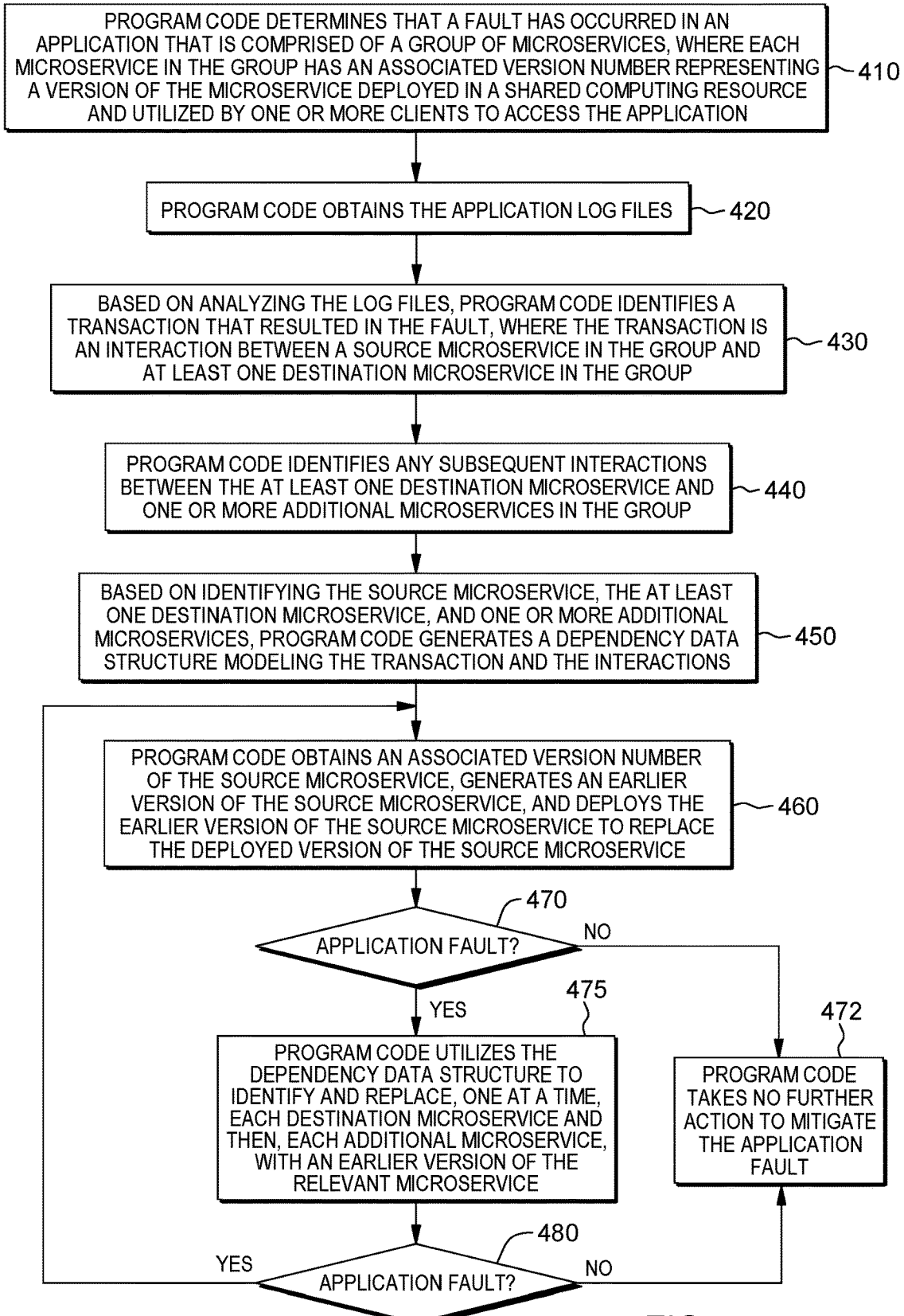
FIG. 4 depicts a workflow illustrating certain aspects of an embodiment of the present invention.

FIG. 4 is a workflow 400 that illustrates certain aspects of some embodiments of the present invention. As illustrated in FIG. 4, in an embodiment of the present invention, program code, executed by a processor(s), determines that a fault has occurred in an application, where the application is comprised of a group of microservices, where each microservice in the group has an associated version number representing a version of the microservice deployed in a shared computing resource and is utilized by one or more clients to access the application (410). The program code obtains the application log files (420). Based on analyzing the log files, the program code identifies a transaction that resulted in the fault, where the transaction is an interaction between a source microservice in the group and at least one destination microservice in the group (430). The program code identifies any subsequent interactions between the at least one destination microservice and one or more additional microservices in the group (440). Based on identifying the source microservice, the at least one destination microservice, and one or more additional microservices, the program code generates a dependency data structure modeling the transaction and the interactions (450).

The program code obtains an associated version number of the source microservice, generates an earlier version of the source microservice, and deploys the earlier version of the source microservice to replace the deployed version of the source microservice (460). Subsequent to this replacement, the program code determines if the fault occurs again (470). Based on determining that the fault is no longer occurring, the program code takes no further action to mitigate the fault (472). Based on determining that the fault has occurred again, the program code utilizes the dependency data structure to identify and replace, one at a time, each destination microservice and then, each additional microservice, with an earlier version of the relevant microservice (475) until the program code determines that the fault is no longer occurring in the application (480) and takes no further action to mitigate the application fault (472). If the program code determines that the fault persists after the replacement of the source microservice, the destination microservice(s), and the additional microservice(s), the program code continues replacing the versions with earlier versions (460) until the fault is no longer occurring (470) (480).

Figure 5:
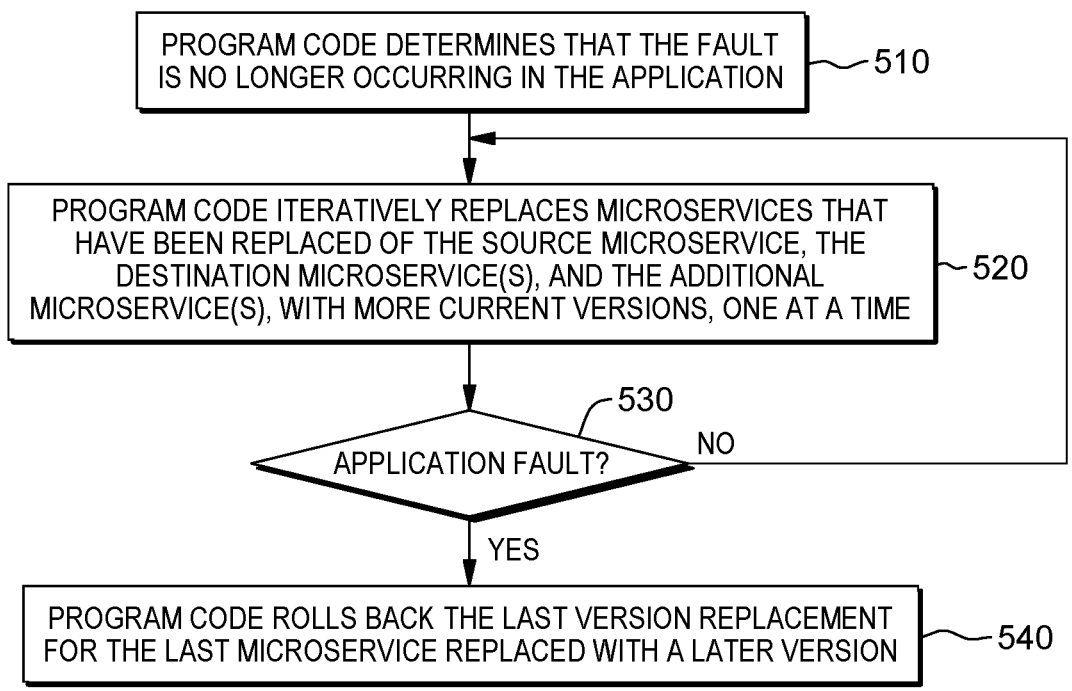
FIG. 5 depicts a workflow illustrating certain aspects of an embodiment of the present invention.

FIG. 5 is a workflow 500 illustrating some aspects of certain embodiments of the present invention. In some embodiments of the present invention, upon determining that fault is no longer occurring, rather than taking no further action (e.g., FIG. 4, 472), upon determining that the fault is no longer occurring (510), the program code iteratively replaces microservices that have been replaced of the source microservice, the destination microservice(s), and the additional microservice(s), with more current versions, one at a time (520), determining after each replacement if the fault has occurred again (530). Based on the fault occurring, the program code rolls back the last version replacement for the last microservice replaced with a later version (540). The phase of the program code replacing the microservices with earlier versions (e.g., FIG. 4) can be understood as a first phase and the phase of the program code replacing the now downgraded versions with new versions, iteratively, can be understood as a second phase (e.g., FIG. 5).

Embodiments of the present invention include a computer-implemented method, a computer program product, and a computer system, where program code executed by a processor(s) obtains a notification of a fault in an information service comprising multiple microservices, wherein the notification comprises logs tracking execution of the information service in a shared computing environment. The program code generates a dependency data structure describing interdependencies between individual microservices of the multiple microservices with respect to each other, where by: 1) analyzing the logs to locate a transaction that generated the fault, where the transaction comprises an interaction between some of the multiple microservices; 2) identifying in the interaction, a source microservice and one or more destination microservices; and 3) generating the dependency data structure, where the dependency data structure comprises representations of the source microservice and the one or more destination microservices and the interdependencies, where the interdependencies comprise interdependencies between the source microservice and the one or more destination microservices. The program code mitigates the fault by replacing a faulty microservice in the microservices represented in the dependency data structure, where the faulty microservice comprises program code that includes an issue resulting in the fault, the mitigating by: 1) continuously monitoring the information service, to obtain notifications of the fault; and 2) progressively replacing, in accordance with the interdependencies in the dependency data structure, each microservice represented in the dependency data structure with an earlier version of the microservice. The program code halts the progressively replacing, when no notification for the fault is obtained, via the monitoring, subsequent to a replacement of a given microservice, where the given microservice is the faulty microservice.

In some embodiments of the present invention, when the program code generates the dependency data structure it also identifies one or more additional microservices from the microservices, wherein the one or more additional microservices each depend from a microservice of the one or more destination microservices. Additionally, the program code generates a dependency data structure that includes representations of the one or more additional microservices, where the interdependencies further comprise interdependencies between the one or more destination microservices and the additional microservices.

In some embodiments of the present invention, the interdependencies are one of: a direct dependency between two of more microservices of the multiple microservices or an indirect dependency between two of more microservices of the multiple microservices.

In some embodiments of the present invention, the interaction comprises a representational state transfer call.

In some embodiments of the present invention, the program code also mitigates the fault by progressively replacing, in a phase of additional replacements, in accordance with the interdependencies in the dependency data structure, each microservice represented in the dependency data structure with a later version of the microservice; and continuously monitoring, by the one or more processors, the information service, to obtain notifications of the fault. The program code halts this progressively replacing (in the phase of the additional replacements), when a notification for the fault is obtained, via the monitoring, subsequent to a given replacement of a particular microservice. The program code reverts the given replacement, from later version of the particular microservice, to an earlier version of the particular microservice, wherein the later version of the particular microservice includes the issue resulting in the fault.

In some embodiments of the present invention, the dependency structure comprises a directed graph.

In some embodiments of the present invention, the information service comprises a software application.

In some embodiments of the present invention, the program code also deploys the information service, which includes the program code deploying a version of each microservice of the multiple microservices and the program code obtaining configuration information related to the version of each microservice deployed. The program code may also retain the configuration information in a database. Thus, as part of the progressively replacing, the program code determines the version of each microservice deployed, based on the configuration information and the program code builds the earlier version of each microservice, based on the version of each microservice deployed.

Referring now to FIG. 6, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention, cloud computing system 220 (FIG. 2), deployment engine 205 (FIG. 2), and deployment driver 210 (FIG. 2) can each be understood as one or more cloud computing nodes 10, and if not cloud computing nodes 10, then one or more general computing node that includes aspects of the cloud computing node 10.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 that can be utilized as cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
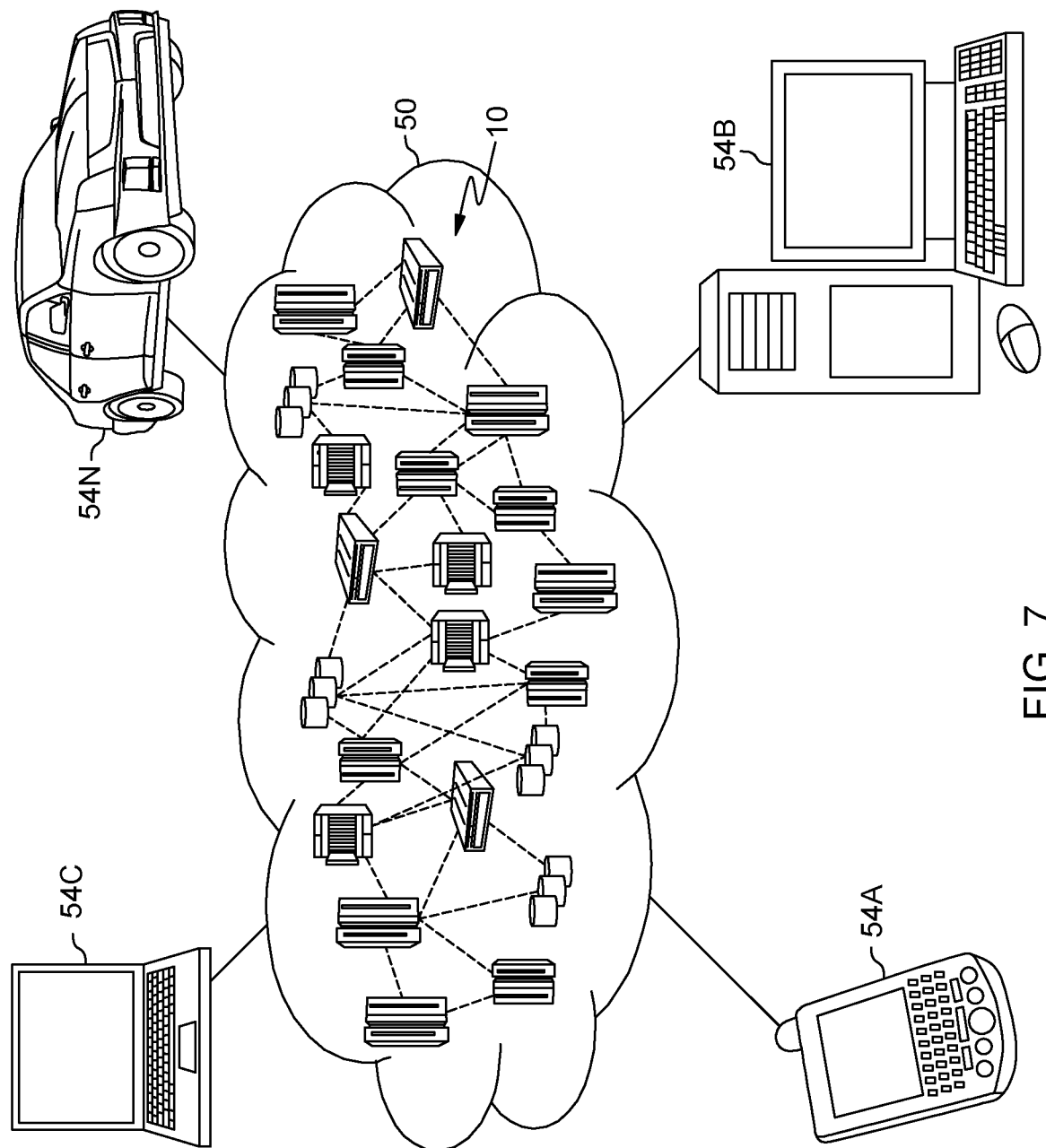
FIG. 7 depicts a cloud computing environment according to an embodiment of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
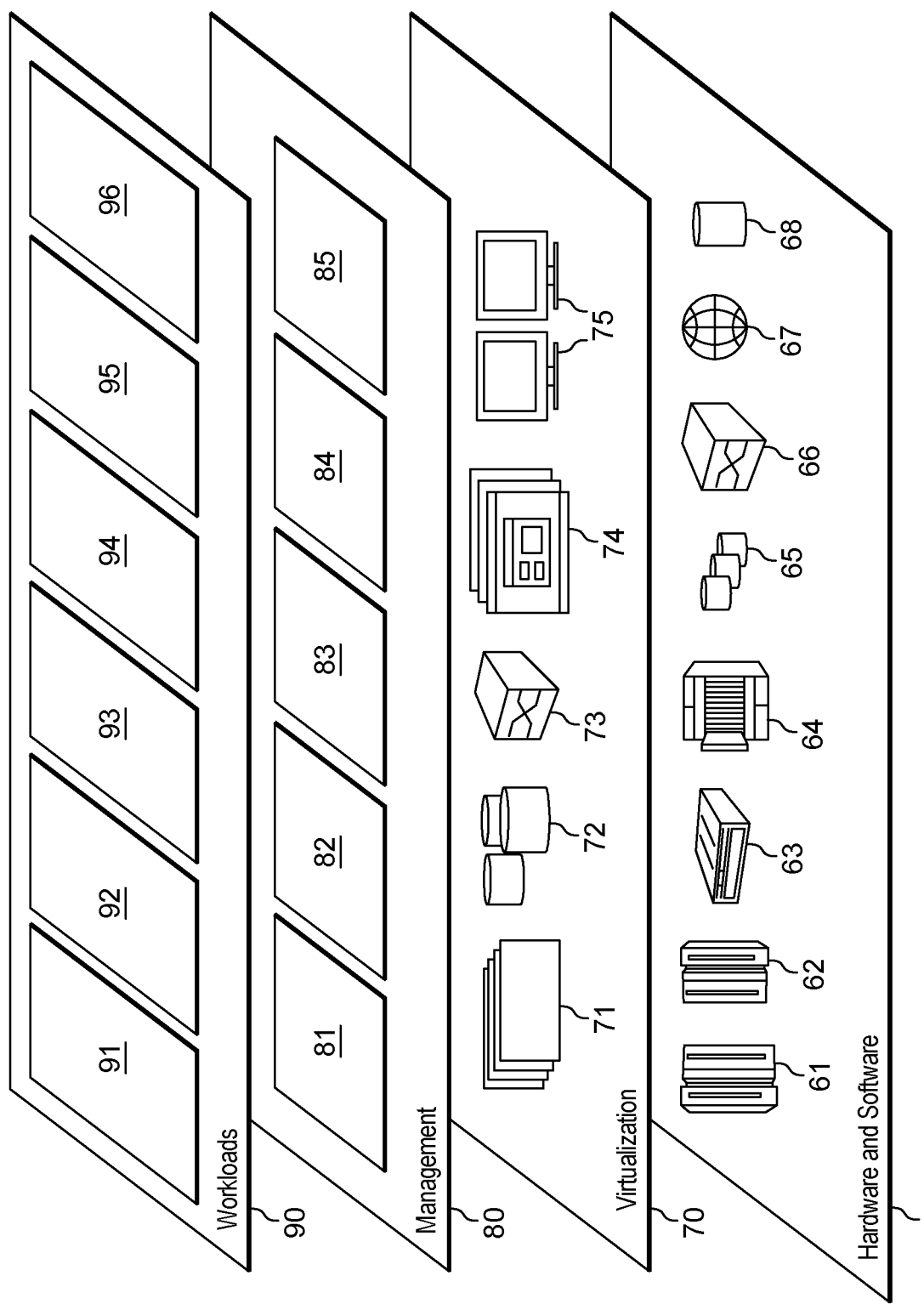
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and identifying and mitigating an issue with a microservice in a microservice architecture 96.

As those of skill in the art will appreciate, various embodiments of the present invention, may be directed to microservices that have one, some or all of the Twenty Possible Microservice Characteristics, identified, above, in the Background section.

As those of skill in the art will appreciate, various embodiments of the present invention, may be directed microservice relationships fall under one, some or all of the Eleven Possible Dependency Types, identified, above, in the Background section.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising:
obtaining, by one or more processors, a notification of a fault in an information service comprising multiple microservices, wherein the notification comprises logs tracking execution of the information service in a shared computing environment;
generating, by the one or more processors, a dependency data structure describing interdependencies between individual microservices of the multiple microservices with respect to each other, wherein the generating comprises:
analyzing, by the one or more processors, the logs to locate a transaction that generated the fault, where the transaction comprises an interaction between some of the multiple microservices;
identifying, by the one or more processors, in the interaction, a source microservice and one or more destination microservices; and
generating, by the one or more processors, the dependency data structure, wherein the dependency data structure comprises representations of the source microservice and the one or more destination microservices and the interdependencies, wherein the interdependencies comprise interdependencies between the source microservice and the one or more destination microservices;
mitigating, by the one or more processors, the fault by replacing a faulty microservice in the microservices represented in the dependency data structure, wherein the faulty microservice comprises program code that includes an issue resulting in the fault, the mitigating comprising:
continuously monitoring, by the one or more processors, the information service, to obtain notifications of the fault; and
progressively replacing, by the one or more processors, in accordance with the interdependencies in the dependency data structure, each microservice represented in the dependency data structure with an earlier version of the microservice; and
halting, by the one or more processors, the progressively replacing, when no notification for the fault is obtained, via the monitoring, subsequent to a replacement of a given microservice, wherein the given microservice is the faulty microservice.

2. The computer-implemented of claim 1, wherein generating the dependency data structure further comprises:
identifying, by the one or more processors, one or more additional microservices from the microservices, wherein the one or more additional microservices each depend from a microservice of the one or more destination microservices; and
generating, by the one or more processors, the dependency data structure, wherein the dependency data structure further comprises representations of the one or more additional microservices, and wherein the interdependencies further comprise interdependencies between the one or more destination microservices and the additional microservices.

3. The computer-implemented method of claim 1, wherein the interdependencies are selected from the group consisting of: a direct dependency between two of more microservices of the multiple microservices, and an indirect dependency between two of more microservices of the multiple microservices.

4. The computer implemented method of claim 1, wherein the interaction comprises a representational state transfer call.

5. The computer-implemented method of claim 1, the mitigating further comprising:
progressively replacing, by the one or more processors, in a phase of additional replacements, in accordance with the interdependencies in the dependency data structure, each microservice represented in the dependency data structure with a later version of the microservice; and
continuously monitoring, by the one or more processors, the information service, to obtain notifications of the fault; and
halting, by the one or more processors, the progressively replacing in the phase of the additional replacements, when a notification for the fault is obtained, via the monitoring, subsequent to a given replacement of a particular microservice; and
reverting, by the one or more processors, the given replacement, from later version of the particular microservice, to an earlier version of the particular microservice, wherein the later version of the particular microservice includes the issue resulting in the fault.

6. The computer-implemented method of claim 1, wherein the dependency structure comprises a directed graph.

7. The computer-implemented of claim 1, wherein the information service comprises a software application.

8. The computer-implemented method of claim 1, further comprising:
   deploying, by the one or more processors, the information service, wherein the deploying comprises deploying a version of each microservice of the multiple microservices; and
   obtaining, based on the deploying, configuration information related to the version of each microservice deployed.

9. The computer-implemented method of claim 8, further comprising:
   retaining, by the one or more processors, the configuration information in a database.

10. The computer-implemented method of claim 9, wherein the progressively replacing further comprises:
    determining, by the one or more processors, the version of each microservice deployed, based on the configuration information; and
    building, by the one or more processors, the earlier version of each microservice, based on the version of each microservice deployed.

11. A computer program product comprising:
    a computer readable storage medium readable by one or more processors and storing instructions for execution by the one or more processors for performing a method comprising:
        obtaining, by the one or more processors, a notification of a fault in an information service comprising multiple microservices, wherein the notification comprises logs tracking execution of the information service in a shared computing environment;
        generating, by the one or more processors, a dependency data structure describing interdependencies between individual microservices of the multiple microservices with respect to each other, wherein the generating comprises:
            analyzing, by the one or more processors, the logs to locate a transaction that generated the fault, where the transaction comprises an interaction between some of the multiple microservices;
            identifying, by the one or more processors, in the interaction, a source microservice and one or more destination microservices; and
            generating, by the one or more processors, the dependency data structure, wherein the dependency data structure comprises representations of the source microservice and the one or more destination microservices and the interdependencies, wherein the interdependencies comprise interdependencies between the source microservice and the one or more destination microservices;
        mitigating, by the one or more processors, the fault by replacing a faulty microservice in the microservices represented in the dependency data structure, wherein the faulty microservice comprises program code that includes an issue resulting in the fault, the mitigating comprising:
            continuously monitoring, by the one or more processors, the information service, to obtain notifications of the fault; and
            progressively replacing, by the one or more processors, in accordance with the interdependencies in the dependency data structure, each microservice represented in the dependency data structure with an earlier version of the microservice; and
            halting, by the one or more processors, the progressively replacing, when no notification for the fault is obtained, via the monitoring, subsequent to a replacement of a given microservice, wherein the given microservice is the faulty microservice.

12. The computer program product of claim 11, wherein generating the dependency data structure further comprises:
    identifying, by the one or more processors, one or more additional microservices from the microservices, wherein the one or more additional microservices each depend from a microservice of the one or more destination microservices; and
    generating, by the one or more processors, the dependency data structure, wherein the dependency data structure further comprises representations of the one or more additional microservices, and wherein the interdependencies further comprise interdependencies between the one or more destination microservices and the additional microservices.

13. The computer program product of claim 11, wherein the interdependencies are selected from the group consisting of: a direct dependency between two of more microservices of the multiple microservices, and an indirect dependency between two of more microservices of the multiple microservices.

14. The computer program product of claim 11, wherein the interaction comprises a representational state transfer call.

15. The computer program product of claim 11, the mitigating further comprising:
    progressively replacing, by the one or more processors, in a phase of additional replacements, in accordance with the interdependencies in the dependency data structure, each microservice represented in the dependency data structure with a later version of the microservice; and
    continuously monitoring, by the one or more processors, the information service, to obtain notifications of the fault; and
    halting, by the one or more processors, the progressively replacing in the phase of the additional replacements, when a notification for the fault is obtained, via the monitoring, subsequent to a given replacement of a particular microservice; and
    reverting, by the one or more processors, the given replacement, from later version of the particular microservice, to an earlier version of the particular microservice, wherein the later version of the particular microservice includes the issue resulting in the fault.

16. The computer program product of claim 11, wherein the dependency structure comprises a directed graph.

17. The computer program product of claim 11, wherein the information service comprises a software application.

18. The computer program product of claim 11, the method further comprising:
    deploying, by the one or more processors, the information service, wherein the deploying comprises deploying a version of each microservice of the multiple microservices; and
    obtaining, based on the deploying, configuration information related to the version of each microservice deployed.

19. The computer program product of claim 18, the method further comprising:

retaining, by the one or more processors, the configuration information in a database, and wherein the progressively replacing further comprises:

determining, by the one or more processors, the version of each microservice deployed, based on the configuration information; and building, by the one or more processors, the earlier version of each microservice, based on the version of each microservice deployed.

20. A system comprising:

one or more memories;

one or more processors in communication with the one or more memories;

program instructions executable by the one or more processors via the one or more memories to perform a method, the method comprising:

obtaining, by the one or more processors, a notification of a fault in an information service comprising multiple microservices, wherein the notification comprises logs tracking execution of the information service in a shared computing environment;

generating, by the one or more processors, a dependency data structure describing interdependencies between individual microservices of the multiple microservices with respect to each other, wherein the generating comprises:

analyzing, by the one or more processors, the logs to locate a transaction that generated the fault, where the transaction comprises an interaction between some of the multiple microservices;

identifying, by the one or more processors, in the interaction, a source microservice and one or more destination microservices; and generating, by the one or more processors, the dependency data structure, wherein the dependency data structure comprises representations of the source microservice and the one or more destination microservices and the interdependencies, wherein the interdependencies comprise interdependencies between the source microservice and the one or more destination microservices;

mitigating, by the one or more processors, the fault by replacing a faulty microservice in the microservices represented in the dependency data structure, wherein the faulty microservice comprises program code that includes an issue resulting in the fault, the mitigating comprising:

continuously monitoring, by the one or more processors, the information service, to obtain notifications of the fault; and progressively replacing, by the one or more processors, in accordance with the interdependencies in the dependency data structure, each microservice represented in the dependency data structure with an earlier version of the microservice; and halting, by the one or more processors, the progressively replacing, when no notification for the fault is obtained, via the monitoring, subsequent to a replacement of a given microservice, wherein the given microservice is the faulty microservice.

\* \* \* \* \*